United States Patent
Liu et al.

(10) Patent No.: US 12,336,034 B2
(45) Date of Patent: Jun. 17, 2025

(54) LINK NEGOTIATION INCLUDING PRIORITY TRAFFIC

(71) Applicant: Apple Inc., Cupertino, CA (US)

(72) Inventors: Yong Liu, Campbell, CA (US); Jarkko L. Kneckt, Los Gatos, CA (US); Su Khiong Yong, San Jose, CA (US); Qi Wang, Sunnyvale, CA (US); Jinjing Jiang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 507 days.

(21) Appl. No.: 17/939,191

(22) Filed: Sep. 7, 2022

(65) Prior Publication Data

US 2023/0247698 A1    Aug. 3, 2023

Related U.S. Application Data

(60) Provisional application No. 63/304,267, filed on Jan. 28, 2022.

(51) Int. Cl.
| | | |
|---|---|---|
| *H04W 76/15* | (2018.01) | |
| *H04W 28/02* | (2009.01) | |
| *H04W 72/543* | (2023.01) | |
| *H04W 72/566* | (2023.01) | |
| *H04W 84/12* | (2009.01) | |

(52) U.S. Cl.
CPC ....... *H04W 76/15* (2018.02); *H04W 28/0252* (2013.01); *H04W 28/0263* (2013.01); *H04W 72/543* (2023.01); *H04W 72/569* (2023.01); *H04W 84/12* (2013.01)

(58) Field of Classification Search
CPC ....... H04W 28/0252–0263; H04W 72/54–569; H04W 76/15–16
See application file for complete search history.

(56) References Cited

U.S. PATENT DOCUMENTS

| | | | |
|---|---|---|---|
| 11,202,286 B2 * | 12/2021 | Huang | ............... H04W 72/542 |
| 2021/0144787 A1 | 5/2021 | Kwon | |
| 2024/0298247 A1 * | 9/2024 | Huang | ................. H04W 28/02 |
| 2025/0071602 A1 * | 2/2025 | Viger | ................. H04L 47/6215 |

FOREIGN PATENT DOCUMENTS

| | | | |
|---|---|---|---|
| WO | 2022008676 | 1/2022 | |
| WO | 2022026527 | 3/2022 | |
| WO | WO-2023066181 A1 * | 4/2023 | ........... H04W 28/12 |

* cited by examiner

*Primary Examiner* — Brendan Y Higa
(74) *Attorney, Agent, or Firm* — Kowert, Hood, Munyon, Rankin & Goetzel, P.C.

(57) ABSTRACT

Methods, systems and apparatuses for negotiating mapping between traffic flows and different links by an access point (AP) multi-link device (MLD) and non-AP MLD are described. An AP MLD may transmit an initial request for a first limited mapping. A non-AP MLD may change to the first limited mapping. The non-AP MLD may register one or more high priority traffic flows and may change to a second mapping accommodating the high priority traffic flows on at least one additional link. The non-AP MLD and AP MLD may additionally exchange second and final mapping negotiation messages.

20 Claims, 10 Drawing Sheets

| All TIDs mapped to all links (AT2AL-default) | | | | | |
|---|---|---|---|---|---|
| Link 1 | TID0 | TID1 | TID2 | TID3 | ... |
| Link 2 | TID0 | TID1 | TID2 | TID3 | ... |
| Link 3 | TID0 | TID1 | TID2 | TID3 | ... |

FIG. 9

| All TIDs mapped to a link subset (AT2LS) | | | | | |
|---|---|---|---|---|---|
| Link 1 | TID0 | TID1 | TID2 | TID3 | ... |
| Link 2 | TID0 | TID1 | TID2 | TID3 | ... |
| Link 3 | x | x | x | x | ... |

FIG. 10

| Enhanced Link Subset (EAT2LS) | | | | | |
|---|---|---|---|---|---|
| Link 1 | TID0 | TID1 | TID2 | TID3 | ... |
| Link 2 | TID0 | TID1 | TID2 | TID3 | ... |
| Link 3 | X | X | TID2 | TID3 | ... |

FIG. 11

LINK NEGOTIATION INCLUDING PRIORITY TRAFFIC

PRIORITY CLAIM

This application claims priority to U.S. provisional patent application Ser. No. 63/304,267, entitled "Link negotiation," filed Jan. 28, 2022, which is hereby incorporated by reference in its entirety as though fully and completely set forth herein.

FIELD

The present application relates to wireless communications, including techniques for wireless communication among wireless stations and/or access points in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (and/or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices", "user equipment", or STA or UE for short. Wireless stations can be either wireless access points or wireless clients (and/or mobile stations). Access points (APs), which are also referred to as wireless routers, act as base stations for the wireless network. APs transmit and receive radio frequency signals for communication with wireless client devices. APs may also couple to the Internet in a wired and/or wireless fashion. Wireless clients operating on an 802.11 network can be any of various devices such as laptops, tablet devices, smart phones, smart watches, or fixed devices such as desktop computers. Wireless client devices are referred to herein as user equipment (and/or UE for short). Some wireless client devices are also collectively referred to herein as mobile devices or mobile stations (although, as noted above, wireless client devices overall may be stationary devices as well).

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Some WLANs may utilize multi-link operation (MLO), e.g., using a plurality of channels (e.g., links) concurrently. APs and/or STAs capable of MLO may be referred to as multi-link devices (MLD). For example, APs capable of MLO may be referred to as AP-MLDs and STAs capable of MLO that are not acting as APs may be referred to as non-AP MHLDs. Improvements in the field are desired.

SUMMARY

Embodiments described herein relate to systems, methods, apparatuses, and mechanisms for link mapping negotiation by AP and non-AP MLDs.

An access point (AP) multi-link device (MLD) (AP MILD) may provide a plurality of links. The AP MLD may transmit, to a non-access point MLD (non-AP MLD), an initial traffic identifier (TID) to link (T2L) mapping request for a first mapping between a plurality of TIDs and at least a subset of the plurality of links for communication with the non-AP MLD. A first TID may be mapped to a first number of the plurality of links according to the first mapping. The AP MLD may receive, from the non-AP MILD, a request to register the first TID as high-priority. In response to the request to register the first TID as high-priority, the AP MLD may change to a second mapping for communication with the non-AP MLD. The first TID may be mapped to a second number, greater than the first number, of the plurality of links according to the second mapping.

A non-AP MLD may associate, with an AP MILD, using a default mapping between a plurality of traffic identifiers and a plurality of links. The plurality of links may comprise different links connecting the AP MLD and the non-AP MLD. The non-AP MLD may receive, from the AP MHLD, an indication of a second mapping between the plurality of traffic identifiers and the plurality of links. According to the second mapping at least a first traffic identifier may be mapped to fewer links than according to the default mapping. The non-AP MLD may determine that the first traffic identifier is high priority. In response to the determination that the first traffic identifier is high priority, the non-AP MLD may transmit, to the AP MHLD, a request to register the first traffic identifier as high priority and may change to a third mapping. According to the third mapping at least the first traffic identifier may be mapped to more links than according to the second mapping.

The AP MLD and non-AP MLD may exchange additional messages with additional proposals and information related to link mapping negotiation.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 9-11 illustrate example mappings, according to some embodiments.

Figure 1:
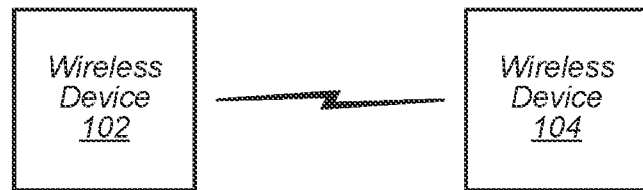
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
STA: Wireless Station
TX: Transmission/Transmit
RX: Reception/Receive
MLD: Multi-link Device
LAN: Local Area Network
WLAN: Wireless LAN
RAT: Radio Access Technology
QoS: Quality of Service Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (and/or combination of devices) having at least one processor that executes instructions from a memory medium.

Mobile Device (and/or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (and/or combination of devices) which is easily transported by a user and capable of wireless communication using WLAN or Wi-Fi.

Wireless Device (and/or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (and/or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
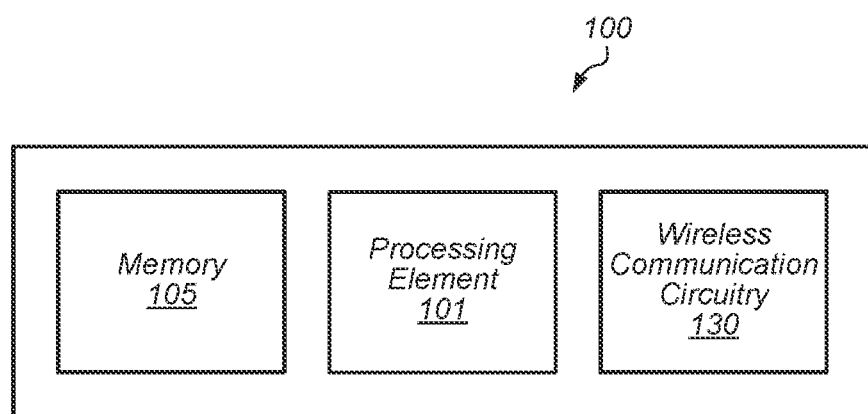
FIG. 2 illustrates an example simplified block diagram of a wireless device, according to some embodiments.

FIGS. 1-2—Wireless Communication System

FIG. 1 illustrates an exemplary (and simplified) wireless communication system in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device. The first wireless device 102 and the second wireless device 104 may communicate wirelessly using any of a variety of wireless communication techniques, potentially including ranging wireless communication techniques.

As one possibility, the first wireless device 102 and the second wireless device 104 may perform ranging using wireless local area networking (WLAN) communication technology (e.g., IEEE 802.11/Wi-Fi based communication) and/or techniques based on WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102 and 104 may be any of a variety of types of wireless device. As one possibility, one or more of the wireless devices 102 and/or 104 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 102 and/or 104 may be a substantially stationary device, such as a set top box, media player (e.g., an audio or audiovisual device), gaming console, desktop computer, appliance, door, access point, base station, or any of a variety of other types of device.

Each of the wireless devices 102 and 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102 and 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, a wireless device (e.g., either of wireless devices 102 or 104) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MILD.

Figure 6:
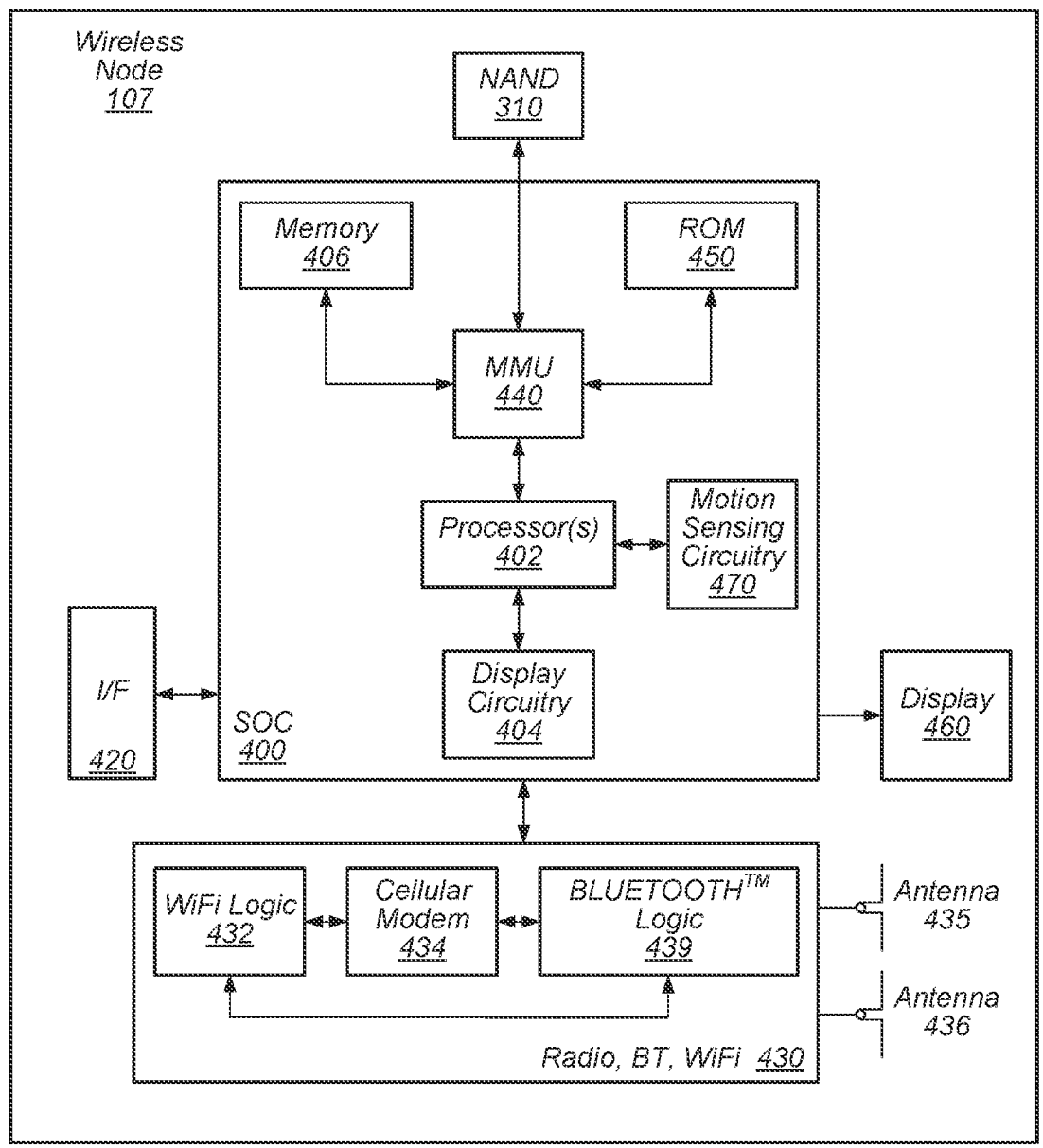
FIG. 6 illustrates an example simplified block diagram of a wireless node, according to some embodiments.

FIG. 6 illustrates an exemplary wireless device 100 (e.g., corresponding to wireless devices 102 and/or 104) that may be configured for use in conjunction with various aspects of the present disclosure. The device 100 may be any of a variety of types of device and may be configured to perform any of a variety of types of functionality. The device 100 may be a substantially portable device or may be a substantially stationary device, potentially including any of a variety of types of device. The device 100 may be configured to perform one or more ranging wireless communication techniques or features, such as any of the techniques or features illustrated and/or described subsequently herein with respect to any or all of the Figures.

As shown, the device 100 may include a processing element 101. The processing element may include or be coupled to one or more memory elements. For example, the device 100 may include one or more memory media (e.g., memory 105), which may include any of a variety of types of memory and may serve any of a variety of functions. For example, memory 105 could be RAM serving as a system memory for processing element 101. Other types and functions are also possible.

Additionally, the device 100 may include wireless communication circuitry 130. The wireless communication circuitry may include any of a variety of communication elements (e.g., antenna(s) for wireless communication, analog and/or digital communication circuitry/controllers, etc.) and may enable the device to wirelessly communicate using one or more wireless communication protocols.

Note that in some cases, the wireless communication circuitry 130 may include its own processing element (e.g., a baseband processor), e.g., in addition to the processing element 101. For example, the processing element 101 may be an 'application processor' whose primary function may be to support application layer operations in the device 100, while the wireless communication circuitry 130 may be a 'baseband processor' whose primary function may be to support baseband layer operations (e.g., to facilitate wireless communication between the device 100 and other devices) in the device 100. In other words, in some cases the device 100 may include multiple processing elements (e.g., may be a multi-processor device). Other configurations (e.g., instead of or in addition to an application processor/baseband processor configuration) utilizing a multi-processor architecture are also possible.

The device 100 may additionally include any of a variety of other components (not shown) for implementing device functionality, depending on the intended functionality of the device 100, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 100, such as processing element 101, memory 105, and wireless communication circuitry 130, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (and/or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 101, peripheral interfaces for communication with peripheral components within or external to device 100, etc.) may also be provided as part of device 100.

FIG. 3—WLAN System

Figure 3:
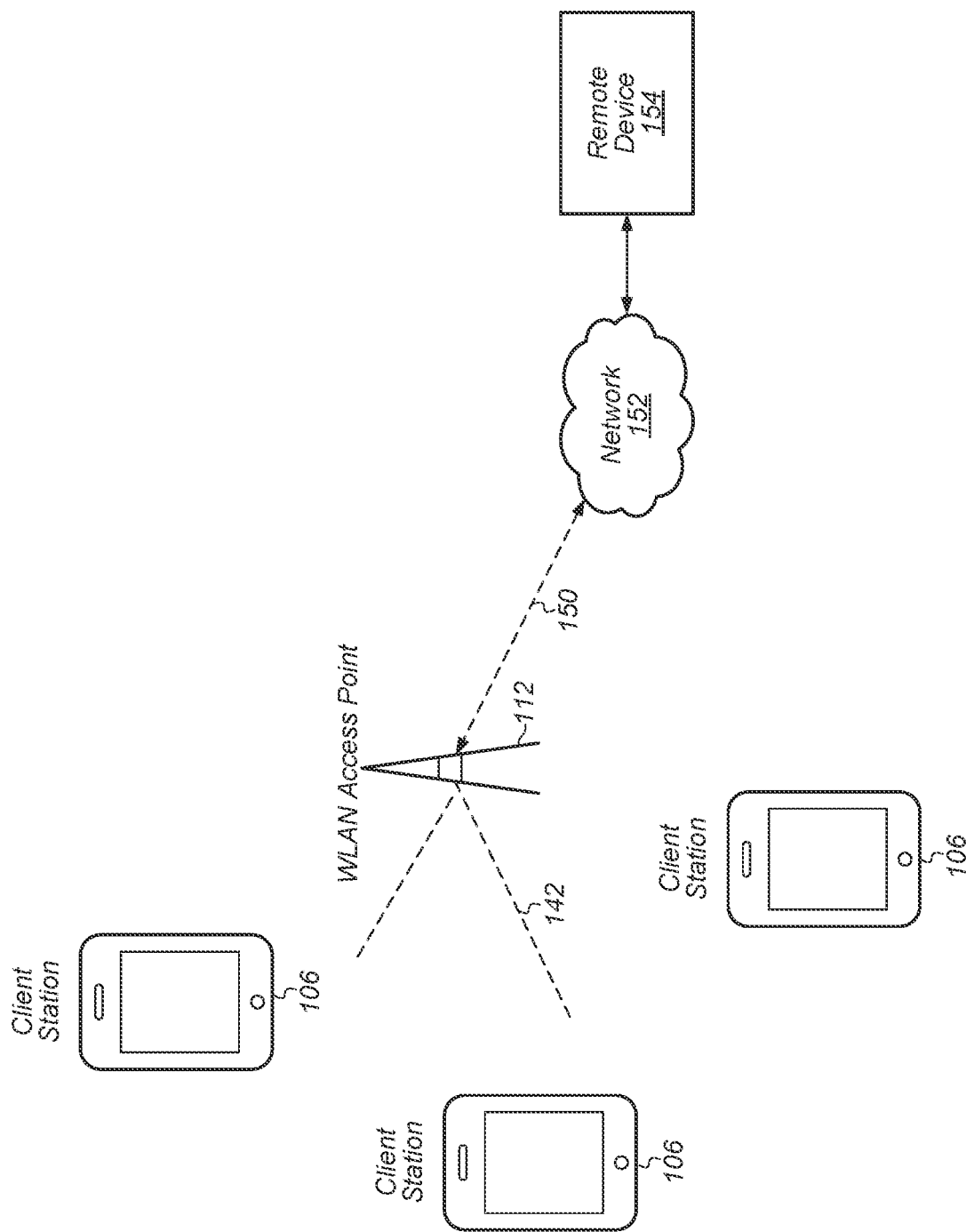
FIG. 3 illustrates an example WLAN communication system, according to some embodiments.

FIG. 3 illustrates an example WLAN system according to some embodiments. As shown, the exemplary WLAN system includes a plurality of wireless client stations or devices (e.g., STAs or user equipment (UEs)), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station, a server associated with an application executing on one of the STAs 106, etc. The WLAN system may be configured to operate according to any of various communications standards, such as the various IEEE 802.11 standards. In some embodiments, at least one wireless device 106 is configured to communicate directly with one or more neighboring mobile devices, without use of the access point 112.

Further, in some embodiments, a wireless device 106 (which may be an exemplary implementation of device 100) may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MILD.

Figure 4:
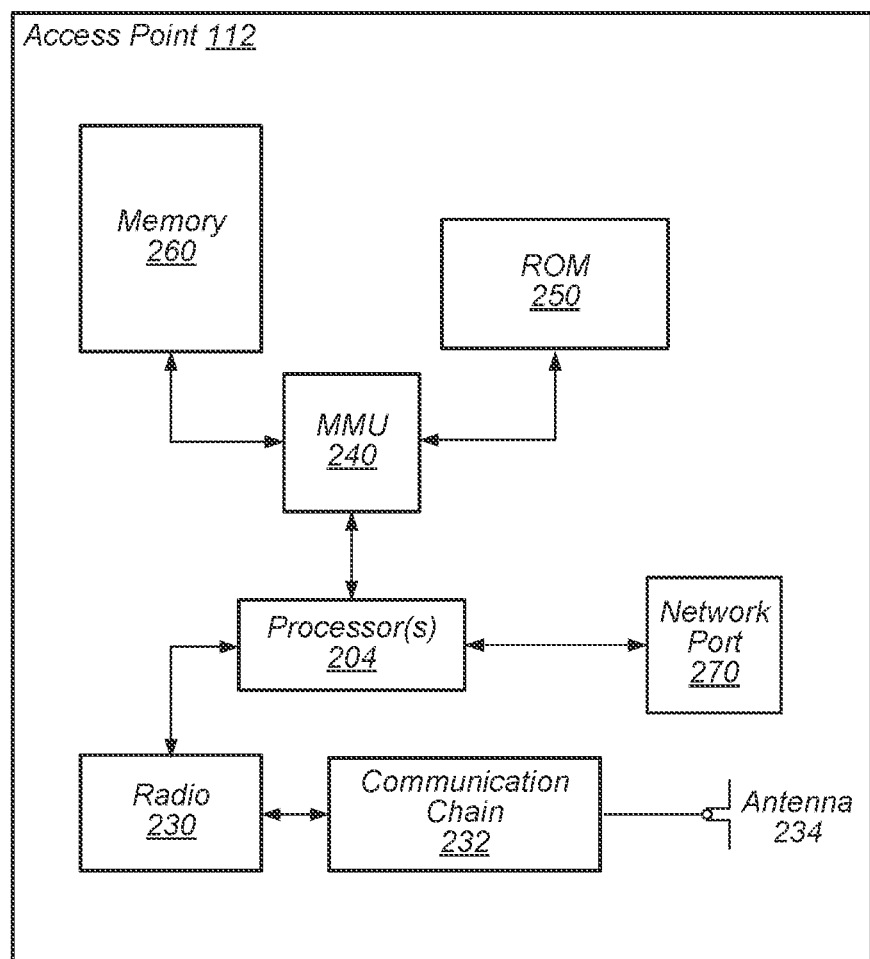
FIG. 4 illustrates an example simplified block diagram of a WLAN Access Point (AP), according to some embodiments.

FIG. 4—Access Point Block Diagram

FIG. 4 illustrates an exemplary block diagram of an access point (AP) 112, which may be one possible exemplary implementation of the device 100 illustrated in FIG. 4. It is noted that the block diagram of the AP of FIG. 4 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (and/or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

Further, in some embodiments, as further described below, AP 112 may be configured to perform methods for robust discovery of a new access point (AP) in AP MLD, robust link addition to an AP MLD association, AP beaconing modes when the AP is added or deleted to/from an AP MLD, and robust BSS transition management (BTM) signaling to steer a non-AP MLD to a best AP MLD and to most suitable APs, as well as privacy improvements for associated non-AP MILD.

Figure 5:
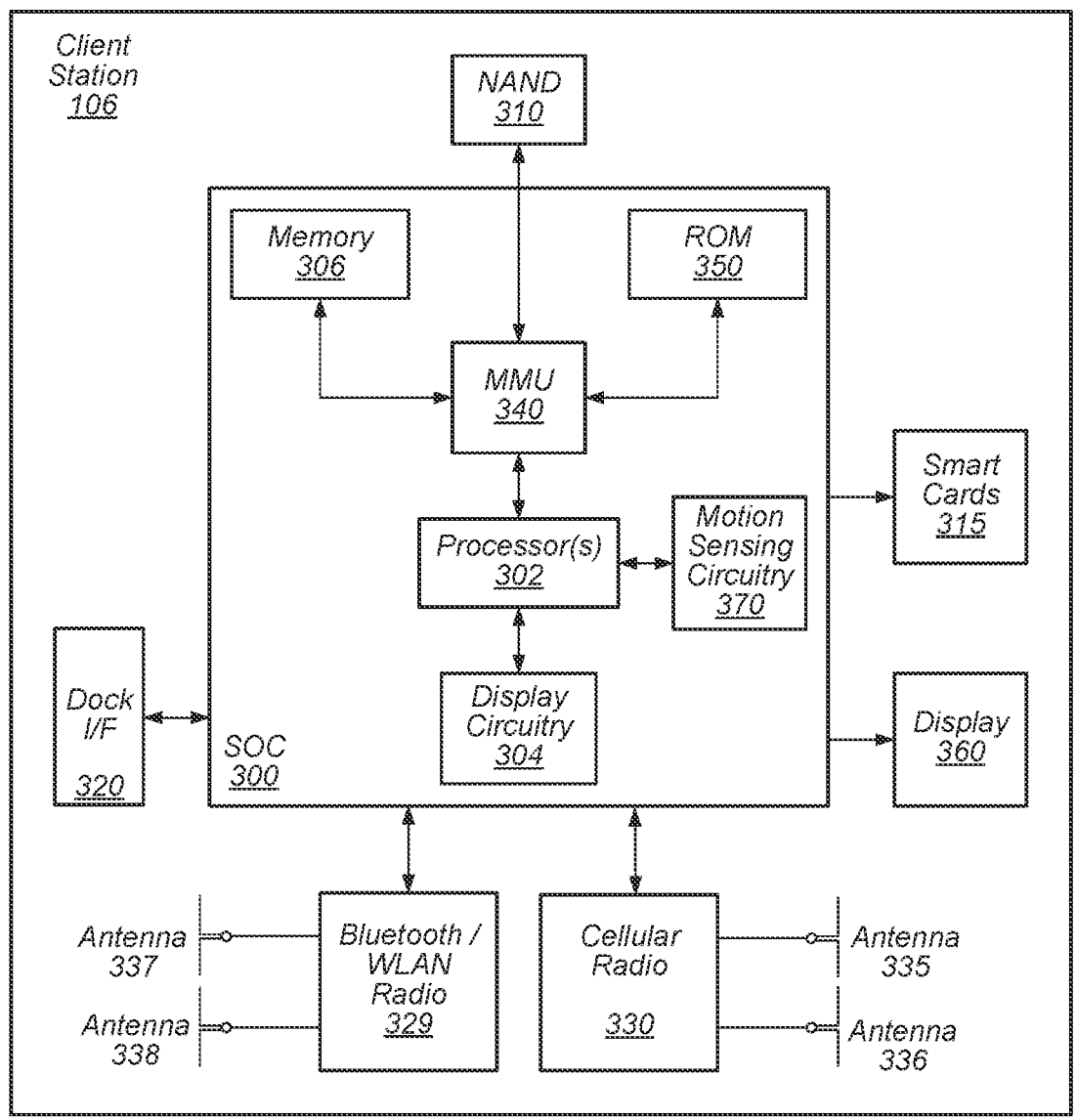
FIG. 5 illustrates an example simplified block diagram of a wireless station (STA), according to some embodiments.

FIG. 5—Client Station Block Diagram

FIG. 5 illustrates an example simplified block diagram of a client station 106, which may be one possible exemplary implementation of the device 100 illustrated in FIG. 4. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (and/or dock) 320 (e.g., for coupling to a computer system, dock, charging station, etc.), the display 360, cellular communication circuitry (e.g., cellular radio) 330 such as for 5G NR, LTE, GSM, etc., and short to medium range wireless communication circuitry (e.g., Bluetooth™/WLAN radio) 329 (e.g., Bluetooth™ and WLAN circuitry). The client station 106 may further include one or more smart cards 315 that incorporate SIM (Subscriber Identity Module) functionality, such as one or more UICC(s) (Universal Integrated Circuit Card(s)). The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration. Some or all components of the short to medium range wireless communication circuitry 329 and/or the cellular communication circuitry 330 may be used for ranging communications, e.g., using WLAN, Bluetooth, and/or cellular communications.

As shown, the SOC 300 may include processor(s) 302, which may execute program instructions for the client station 106 and display circuitry 304, which may perform graphics processing and provide display signals to the display 360. The SOC 300 may also include motion sensing circuitry 370 which may detect motion of the client station 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 3 or for ranging as shown in FIG. 1.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (and/or in addition), processor 302 may be configured as a programmable hardware element, such as an FPGA (Field Programmable Gate Array), or as an ASIC (Application Specific Integrated Circuit). Alternatively (and/or in addition) the processor 302 of the UE 106, in conjunction with one or more of the other components 300, 304, 306, 310, 315, 320,329, 330, 335, 336, 337, 338, 340, 350, 360, 370 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

FIG. 6—Wireless Node Block Diagram

FIG. 6 illustrates one possible block diagram of a wireless node 107, which may be one possible exemplary implementation of the device 106 illustrated in FIG. 5. As shown, the wireless node 107 may include a system on chip (SOC) 400, which may include portions for various purposes. For example, as shown, the SOC 400 may include processor(s) 402 which may execute program instructions for the wireless node 107, and display circuitry 404 which may perform graphics processing and provide display signals to the display 460. The SOC 400 may also include motion sensing circuitry 470 which may detect motion of the wireless node 107, for example using a gyroscope, accelerometer, and/or any of various other motion sensing components. The processor(s) 402 may also be coupled to memory management unit (MMU) 440, which may be configured to receive addresses from the processor(s) 402 and translate those addresses to locations in memory (e.g., memory 406, read only memory (ROM) 450, flash memory 410). The MMU 440 may be configured to perform memory protection and page table translation or set up. In some embodiments, the MMU 440 may be included as a portion of the processor(s) 402.

As shown, the SOC 400 may be coupled to various other circuits of the wireless node 107. For example, the wireless node 107 may include various types of memory (e.g., including NAND flash 410), a connector interface 420 (e.g., for coupling to a computer system, dock, charging station, etc.), the display 460, and wireless communication circuitry 430 (e.g., for 5G NR, LTE, LTE-A, CDMA2000, Bluetooth, Wi-Fi, NFC, GPS, etc.).

The wireless node 107 may include at least one antenna, and in some embodiments, multiple antennas 435 and 436, for performing wireless communication with base stations and/or other devices. For example, the wireless node 107 may use antennas 435 and 436 to perform the wireless communication. As noted above, the wireless node 107 may in some embodiments be configured to communicate wirelessly using a plurality of wireless communication standards or radio access technologies (RATs).

The wireless communication circuitry 430 may include Wi-Fi Logic 432, a Cellular Modem 434, and Bluetooth Logic 439. The Wi-Fi Logic 432 is for enabling the wireless node 107 to perform Wi-Fi communications, e.g., on an 802.11 network. The Bluetooth Logic 439 is for enabling the wireless node 107 to perform Bluetooth communications. The cellular modem 434 may be capable of performing cellular communication according to one or more cellular communication technologies. Some or all components of the wireless communication circuitry 430 may be used for ranging communications, e.g., using WLAN, Bluetooth, and/or cellular communications.

As described herein, wireless node 107 may include hardware and software components for implementing embodiments of this disclosure. For example, one or more components of the wireless communication circuitry 430 (e.g., Wi-Fi Logic 432) of the wireless node 107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 7:
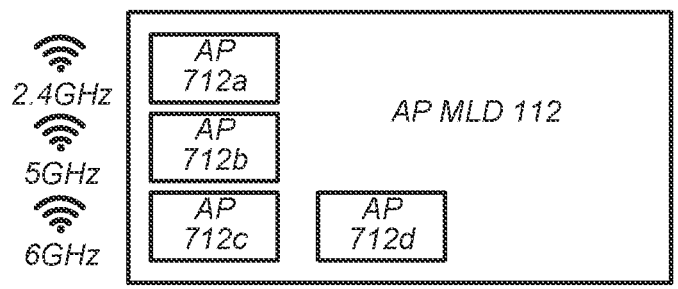
FIG. 7 illustrates an example of an AP MLD, according to some embodiments.
Figure 8:
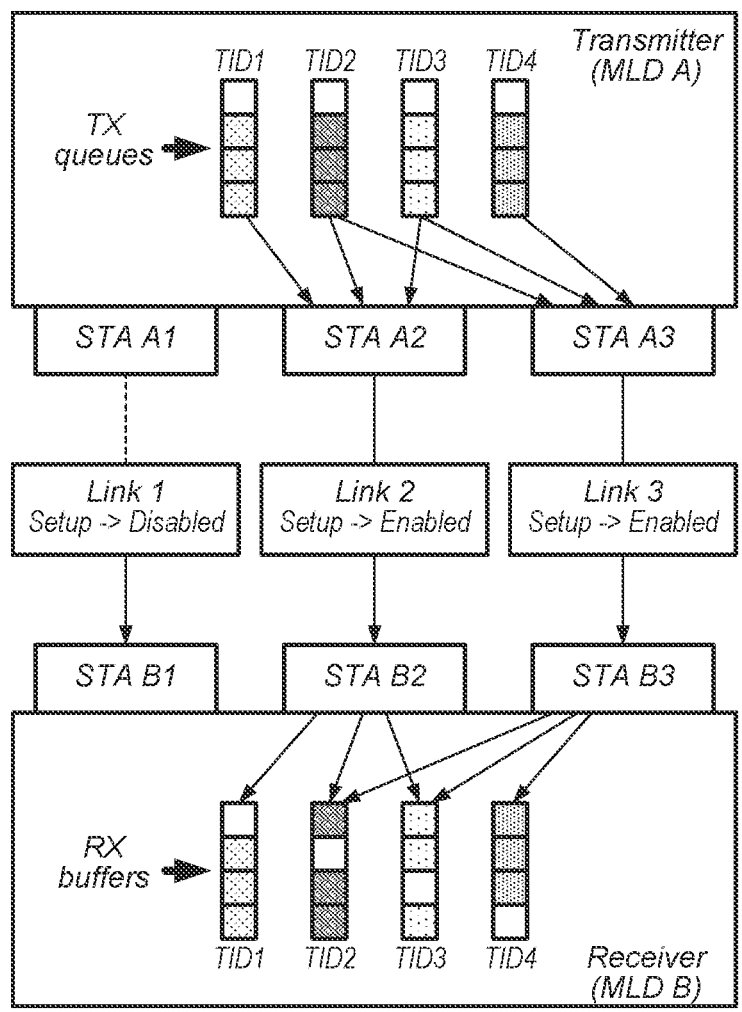
FIG. 8 illustrates an example of two MLDs in communication, according to some embodiments.

FIGS. 7-8—Multi-Link Device (MLD) Operation

Various communication standards such as IEEE 802.11be may include Multi-link Device (MLD) capabilities. In current implementations, an access point (AP) Multi Link Device (MLD) node may manage its affiliated APs. Thus, an AP MLD node may modify, add, and/or subtract affiliated APs to increase capacity, manage Basic Service Sets (BSSs) interference and coverage, including switching APs to operate in channels with least interference, and/or steer associated non-AP MLD nodes to operate on best performing APs and/or AP MLD nodes.

FIG. 7 illustrates an AP MLD 112, according to some embodiments. The AP MLD may operate any number of affiliated APs, e.g., APs 712*a*, 712*b*, 712*c*, and 712*d* in the illustrated example. The affiliated APs may operate on any of various frequency bands. Affiliated APs may operate on different frequency ranges (e.g., channels) of the same band, or on different frequency bands. In the illustrated example, AP 712*a* may operate in a 2.4 GHz band, AP 712*b* may operate in a 5 GHz band, and APs 712*c* and 712*d* may operate in a 6 GHz band. Other arrangements (e.g., of the same and/or other frequency bands) are possible.

The AP MLD may provide the affiliated APs from a single physical device, e.g., a single shared housing and potentially using the same antenna(s). In some embodiments, the AP MLD may provide the APs from multiple distinct devices (e.g., a first device may provide one or more APs, a second device may provide a different one or more APs, etc.). In some embodiments, various affiliated APs may be separated spatially (e.g., beams in different directions, using different antennas with a shared housing (e.g., antennas of a same physical device), and/or of different devices, etc.).

In some embodiments, spatially separated affiliated APs may operate on a same (or overlapping) channel(s).

FIG. 8 illustrates a transmitting MLD A (e.g., 112 or 106) in communication with a receiving MLD B (e.g., 112 or 106), according to some embodiments.

As shown, the MLDs may operate multiple (e.g., 3 each, in the illustrated example) affiliated STAs. Corresponding STAs on each MILD may communicate via corresponding links. For example, STA A1 may communicate with STA B1 over link 1, etc.

Data packets/frames of different traffic identifiers (TIDs) may be exchanged over the same and/or different links (e.g., via corresponding STAs). The transmitting and receiving MLDs may buffer the different TIDs separately, e.g., in TX and RX buffers/queues.

The relationship between the TIDs and the links may be referred to as a mapping (e.g., TID-to-link or T2L mapping). As will be appreciated, many mappings are possible, e.g., including one-to-one mappings, one-to-multiple mappings, multiple-to-one mappings, and/or multiple-to-multiple mappings. In the illustrated example, TIDs 1-3 are mapped to link 2 and TIDs 2-4 are mapped to link 3.

A packet (e.g., frame, or other unit of information) may be sent over one or more of the links to which its TID is mapped. For example, a packet of TID 2 may be sent over either or both of link 2 and/or link 3. The transmitting MLD may select one or more of the mapped links based on any of various factors, such as first link available, lowest energy use, highest likelihood of successful reception, channel conditions, input from the receiving MLD, and/or any combination of (e.g., compromise between) these and/or other factors. In some embodiments, a transmitting AP MLD may transmit on all of the mapped links for the TID and a receiving non-AP MLD may receive on any one or more of the mapped links. In some embodiments, a transmitting non-AP MLD may transmit on any one or more of the mapped links for the TID and a receiving non-AP MLD may monitor to potentially receive on all of the mapped links.

A setup link may be considered to be enabled if at least one TID is mapped to that link and may be considered to be disabled if no TIDs are mapped to that link. If a link is enabled, it may be used for frame exchanges, but only limited to the data frames corresponding to the mapped TIDs and management frames. If a link is disabled, it may not be used for frame exchange, including some of the management frame exchange.

A TID may be mapped to at least one setup link, e.g., unless admission control is used.

In some embodiments, TID-to-link mapping may be unidirectional, e.g., TIDs mapped to an uplink (UL) link may not be the same TIDs mapped to the corresponding downlink (DL) link. In some embodiments, the mapping may be bi-directional, e.g., TIDs may be mapped to the same links for DL as for UL and vice versa.

In some embodiments, by default, all TIDs may be mapped to all setup links for both UL and DL. Therefore, all setup links may be enabled. The default TID-to-link mapping mode may be used if: an AP MLD and a non-AP MLD do not negotiate a different mapping; an AP MLD and a non-AP MLD cannot agree on any alternative mapping; or an AP MLD and a non-AP MLD has torn down a previous agreement, e.g., for an alternative mapping.

In some embodiments, TID-to-link mapping negotiation may occur during the multilink (ML) setup process, e.g., via association frames, or via TID-to-link mapping handshakes. For example, either an AP MLD or a non-AP MLD may initiate the negotiation and either an AP MLD or a non-AP MLD may accept or reject a TID-to-link mapping request from a peer. Further, if TID-To-link mapping is not accepted the peer may propose a preferred/alternative mapping.

The affiliated STAs may include various layers, e.g., media access control (MAC) and/or physical (PHY) layers, among various possibilities. Affiliated STAs of an AP MLD may use different basic service sets (BSS) and/or different BSS identifiers (BSSID), e.g., BSSIDs 1-3. It will be appreciated that any number of affiliated STAs may be used in any combination of bands. For example, an MLD may operate multiple affiliated STAs in one band and/or may not operate any affiliated STAs in a band. A non-AP MLD may operate STAs corresponding to some, none, or all of the APs of an AP MLD. The affiliated STAs may use different addresses.

A non-AP MLD may provide the affiliated STAs from a single physical device, e.g., a single shared housing and potentially using the same antenna(s). In some embodiments, the non-AP MLD may provide the STAs from multiple distinct devices (e.g., a first device may provide one or more STAs, a second device may provide a different one or more STAs, etc.). In some embodiments, various affiliated STAs may be separated spatially (e.g., beams in different directions, using different antennas with a shared housing (e.g., antennas of a same physical device), and/or of different devices, etc.).

The various affiliated STAs may communicate concurrently/simultaneously. For example, STA A1 may exchange uplink and/or downlink data with STA B1 on a first link while STA A2 exchanges uplink and/or downlink data with STA B2 on a second link, etc. It will be appreciated that such concurrent communication may include (e.g., different) data being exchanged at the same time, overlapping times, and/or different times on different links. The number of APs and/or number of STAs may change over time.

FIGS. 9-11—Example Mappings

FIGS. 9-11 illustrate examples of various types of mappings. It will be appreciated that an AP MLD may use the same or different mappings (e.g., of the same or different types) with different non-AP MLDs. For example, the AP MLD may use one mapping with a first non-AP MLD and a second mapping with a second non-AP MLD.

FIG. 9 illustrates an example of a type of mapping in which all TIDs are mapped to all links (e.g., an all TIDs to all links (AT2AL) mapping), according to some embodiments. An AT2AL mapping may be used as a default or initial mapping, according to some embodiments. As shown, TIDs 0-3 (and any additional TIDs) are mapped to all links.

An AT2AL mapping may be most flexible to non-AP MLDs. For example, a non-AP MLD may dynamically select whichever link(s) is/are best suitable for DL and UL data communication. However, an AT2AL mapping may be difficult for an AP MLD to balance the traffic loads (e.g., associated with multiple non-AP MLDs) across multiple links. For example, due to different link selections by various non-AP MLDs, some links may be heavily loaded (e.g., at a given time or over an extended period) while other links may be lightly loaded.

FIG. 10 illustrates an example of a type of mapping in which all TIDs are mapped to a (e.g., same) subset of all links (e.g., an all TIDs to link subset (AT2LS) mapping), according to some embodiments. As shown, TIDs 0-3 (and any additional TIDs) are mapped to links 1 and 2; no TIDs are mapped to link 3.

An AT2LS mapping may be good for an AP MLD to balance the traffic loads across multiple links. For example, an AP MLD may move some non-AP MLDs from busy link(s) to idle link(s) by disabling these non-AP MLDs from using the busy link(s), e.g., by moving these non-AP MLDs to AT2LS mappings.

However, an AT2LS mapping may be less flexible to non-AP MLDs. For example, some non-AP MLDs may be assigned to link(s) not suitable to them (e.g., a link with significant coexistence interference). Similarly, with an AT2LS mapping a non-AP MLD may not quickly move high-priority traffic from one link to another link if the assigned link(s) are blocked (e.g., due to changed position of the non-AP MLD or a user, etc.).

FIG. 11 illustrates an example of a type of mapping in which one or more TIDs are mapped to a subset of all links and one or more TIDs are mapped to all links (e.g., an enhanced link subset (EAT2LS) mapping), according to some embodiments. As shown, TIDs 0-1 are mapped to links 1 and 2; TIDs 2-3 are mapped to links 1-3. Any additional TIDs may be mapped to all links or a subset of the links (e.g., the same or potentially a different subset, such as links 1 and 3 (but not 2), etc.).

An EAT2LS mapping may allow an AP MLD to balance the traffic loads by moving low-priority traffic from busy link(s) to idle link(s). For example, a non-AP MLD using an EAT2LS which prevents the non-AP MLD from using a busy link for low-priority traffic may free up some time/frequency resources on the busy link for high-priority traffic of other non-AP MLDs. Further, an EAT2LS mapping may allow a non-AP MLD to flexibly use all links for high-priority traffic.

It will be appreciated that the mappings illustrated in FIGS. 9-11 are examples and that other mappings are possible. For example, for one non-AP MLD, some TIDs may be mapped to a first subset of links, other TIDs to a second subset (e.g., including, more, fewer, and/or different links), and still other TIDs to all links, etc.

Figure 12:
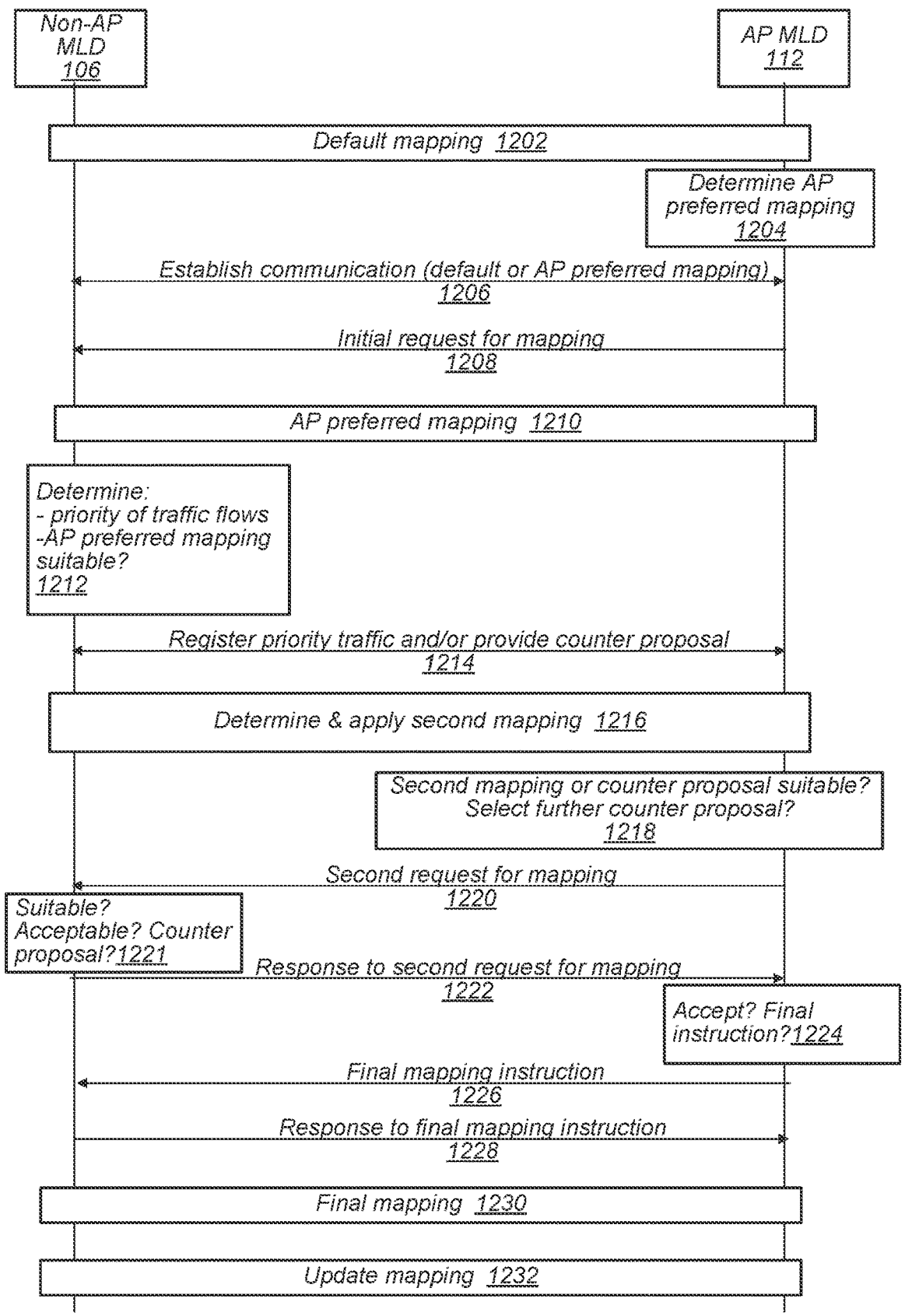
FIG. 12 illustrates an example method of link mapping negotiation by MLDs, according to some embodiments.

FIG. 12—Mapping Negotiation

In some embodiments, AP MLDs request AT2LS mappings, e.g., to facilitate multi-link traffic load balancing across non-AP MLDs and/or other non-APs. However, non-AP MLDs may prefer using AT2AL or EAT2LS mapping to achieve the best flexibility, e.g., in order to better support high-priority traffic. Accordingly, good TID-to-Link mapping negotiation strategies may balance the interests of both AP MLDs and non-AP MLDs.

Embodiments described herein provide systems, methods, and mechanisms for AP and non-AP MLD to perform negotiation of link mapping. For example, according to embodiments of FIG. 12, AP and non-AP MLDs may exchange various messages to negotiate link mapping.

Aspects of the method of FIG. 12 may be implemented by AP MLD in communication with a non-AP MLD. The AP MLD and/or non-AP MLD may be as illustrated in and described with respect to various ones of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. For example, one or more processors (or processing elements) (e.g., processor(s) 101, 204, 302, 402, 432, 434, 439, baseband processor(s), processor(s) associated with communication circuitry such as 130, 230, 232, 329, 330, 430, etc., among various possibilities) may cause a wireless device, STA, UE, non-AP MLD, and/or AP MLD, or other device to perform such method elements.

Note that while at least some elements of the method of FIG. 12 are described in a manner relating to the use of communication techniques and/or features associated with IEEE and/or 802.11 (e.g., 802.11be) specification documents, such description is not intended to be limiting to the disclosure, and aspects of the method of FIG. 12 may be used in any suitable wireless communication system, as desired. Similarly, while elements of the method of FIG. 12 are described in a manner relating to non-AP MLDs, such description is not intended to be limiting to the disclosure, and aspects of the method of FIG. 12 may be used by STAs that are not MLDs, as desired.

The methods shown may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

A non-AP MLD 106 and an AP MLD 112 may be in communication range and may be aware (e.g., individually) of a default mapping (1202), according to some embodiments. For example, a default mapping may be an AT2AL mapping, among various possibilities. The default mapping may be set by a wireless standard (e.g., 802.11, etc.) and/or may be broadcast or otherwise signaled by the AP MLD (e.g., in a beacon frame, etc.). Thus, the non-AP MLD may become aware of the default mapping based on receiving an indication of the default mapping from the AP MLD.

The AP MLD may determine an AP-preferred mapping (1204), according to some embodiments. The AP MLD may select the AP preferred mapping based on any combination of factors, e.g., such as to balance load across links of the AP MHLD. The AP preferred mapping may be specific to the non-AP MLD or may be preferred (e.g., by the AP MLD) for multiple non-AP MLDs (e.g., all or a subset of non-AP MLDs in communicative range of the AP MLD). This determination may occur prior to, concurrently with, or subsequently to the non-AP MLD first communicating with the AP MLD (e.g., in 1206). The determination may be updated and/or revisited periodically or as needed, e.g., based on changing load and/or radio link conditions.

In some embodiments, the AP MLD may broadcast an indication of the AP preferred mapping. The non-AP MLD may receive such an indication, and may thus be aware of the AP preferred mapping prior to associating with the AP MLD.

The AP preferred mapping may be the same as or different from the default mapping. For example, an AT2LS mapping may be the AP preferred mapping, among various possibilities.

The AP MLD may broadcast (e.g., or transmit to the non-AP MLD) the AP preferred mapping together with a reason code and/or additional information elements (e.g., to justify or explain the AP preferred mapping). For example, the AP MLD may include a reason code to indicate "load balancing", etc. Further, the AP MLD may include a BSS load element and/or a high efficiency (HE) BSS load element, which may indicate the number of associated non-AP STAs, number of associated HE STAs, and channel utilization information, etc. The AP MLD may also include a reason code to indicate "guaranteed low latency", together with a Low Latency Support element, which may indicate a number of associated low-latency STAs as well as their guaranteed service intervals, etc.

The AP MLD and non-AP MLD may establish communication/association with each other (1206), according to some embodiments. For example, the non-AP MLD may transmit an association request, beacon, probe, or similar message to the AP MLD to initiate communication. In some embodiments, the message from the non-AP MLD may acknowledge information about a default and/or AP preferred mapping received by the non-AP MLD.

The AP MLD may respond affirmatively, e.g., with an association response, beacon response, probe response, or similar message to the non-AP MLD. An affirmative response from the AP MLD may establish a communication association between the devices.

In some embodiments, the AP MLD may indicate, in its response to the non-AP MLD, the AP preferred mapping. The non-AP MLD may transmit an acknowledgement of such an indication to the AP MLD. In some embodiments, the AP MLD may select the AP preferred mapping in response to a message (e.g., association request, etc.) from the non-AP MLD. Thus, the AP MLD may select the AP preferred mapping based in part on the message from the non-AP MLD.

The AP MLD and non-AP MLD may communicate with either the default or the AP preferred mapping. For example, if the AP has indicated (e.g., in a broadcast message as discussed in 1204 and/or in a response message as discussed in 1206) the AP preferred mapping, the AP MLD and non-AP MLD may initially use the AP preferred mapping.

However, if the AP has not indicated the AP preferred mapping, then the AP MLD and non-AP MLD may initially use the default mapping. In some embodiments, if the non-AP MLD has not acknowledged such an indication of the AP preferred mapping, then the AP MLD and non-AP MLD may initially use the default mapping.

If the AP MLD and non-AP MLD initially use the default mapping and the default mapping is different than the AP preferred mapping, then the AP MLD may transmit, to the non-AP MLD, an initial request for the AP preferred mapping (1208), according to some embodiments. The non-AP MLD may receive the request. Such an initial request may be transmitted any time after (or concurrent with) association. For example, the initial request may be transmitted immediately after association or anytime that the AP MLD determines that the AP preferred mapping is different than the default mapping (e.g., in response to changing load on one or more link, etc.). The initial request for the AP preferred mapping may be transmitted as a T2L negotiation request. In some embodiments, the T2L negotiation request may be transmitted as a multicast message, e.g., with addresses or identifiers (IDs) of multiple non-AP MLDs, e.g., which are requested to use the AP preferred mapping. Alternatively, the T2L negotiation request may be transmit as a unicast message to a single non-AP MLD.

As mentioned above, the AP MLD may multicast or unicast the AP preferred mapping together with a reason code and/or additional information elements, e.g., to justify and/or explain the AP preferred mapping.

In some embodiments, the AP MLD may start a counter proposal timer concurrently with transmitting the initial request for the AP preferred mapping. The non-AP MLD may also start a counter proposal timer in response to receiving the request. Such a counter proposal timer may operate to allow time for the peer (e.g., the non-AP MLD, in this example) to respond to a T2L negotiation request. In the event that the peer (e.g., non-AP MLD) does not respond to the T2L negotiation request with a counter proposal or other message that indicates refusal of the proposed mapping (e.g., the AP preferred mapping), then the proposed mapping may be applied (e.g., by both MLDs) upon expiration of the counter proposal timer.

In some embodiments, a response may be expected prior to expiration of the counter proposal timer. Accordingly, a non-AP MLD may be configured to respond with a T2L negotiation response before the expiration of the counter proposal timer that indicates: 1) acceptance of the AP proposed mapping; or 2) rejection with a counter proposal. The counter proposal includes: 1) no mapping change; 2) falling back to default mapping; 3) alternative mapping (e.g., which is different from the current mapping, default mapping, or AP proposed mapping).

Under some circumstances, the AP MLD and non-AP MLD may apply the AP preferred mapping (1210), according to some embodiments. For example, if the AP preferred mapping is an EAT2LS mapping, then the non-AP MLD may adopt the EAT2LS mapping request from the AP MLD and may transmit/receive allowed TID(s) on all links. The non-AP MLD may also be requested to register the high priority TID(s) (e.g., or provide priority information about some or all TIDs) before applying the EATLS mapping. For example, the AP MLD may provide an indication (e.g., with the AP preferred mapping or in a separate message) that the non-AP MLD should register the priority information.

The non-AP MLD may determine whether a mapping proposed by the AP MLD (e.g., the AP preferred mapping) is suitable and/or the prioritization of one or more TIDs (1212), according to some embodiments. These determinations may be made at any time. For example, these determinations may be made in response to implementing the AP preferred mapping (e.g., in 1206), in response to receiving a request for the AP preferred mapping (e.g., in 1208, e.g., while a counter proposal timer is running), performed periodically, and/or in response to detecting change in conditions (e.g., which TIDs are active, amount of traffic on one or more active TIDs, level of congestion, a determination related to whether a TID is meeting its quality of service (QoS) target(s), latency, throughput, blockage of any link(s), and/or other conditions).

As one possibility, the non-AP MLD may determine priority of any active TID(s), e.g., whether any TID is considered high priority. Such a determination may be made for any or all individual TIDs and/or for any group(s) of TIDs. Such a determination may be based on QoS characteristics of the TID, an application or application type associated with the TID, a type of signaling associated with the TID, and/or other factors. Example QoS characteristics may include: Min Service Interval, Max Service Interval, Min Data Rate, Delay Bound.

For example, the non-AP MLD may make a binary determination of whether the TID meets a definition of high priority. As one possibility, TIDs 4-7 may be considered high priority; other TIDs may not be considered high priority. Alternatively, the non-AP MLD may determine a priority level for the TID according to any desired priority rating scheme, (e.g., high, medium, and low; priority levels 1-10; etc.).

In some embodiments, TID to traffic mapping may be fixed. For example, TIDs 0-3 may map to background and best effort traffic. TIDs 4 and 5 may map to video traffic. TIDs 6 and 7 may map to voice traffic. In general, larger TID values may map to higher priority traffic.

The non-AP MILD may consider suitability of a mapping proposal (e.g., the AP preferred mapping). For example, the non-AP MLD may consider the proposal in view of the priority of the TID(s). For example, the non-AP MLD may determine whether the TID(s) is/are mapped to a sufficient link or set of links for the respective priority level(s) of the TID(s). Such a determination may be made in various ways. As one possibility, the non-AP MLD may determine that a high priority (e.g., priority level above a threshold level) TID may not be mapped to sufficient links if it is mapped to fewer than a threshold number of links (e.g., the threshold may be all links or any desired number). As another possibility, different priority levels may be associated with different thresholds (e.g., high priority TIDs have a threshold of at least 3 links, medium priority TIDs have a threshold of at least 2 links, etc.). As another possibility different links may be evaluated as different quality. For example, a first link may be considered higher quality than a second link and the non-AP MLD may consider that a high priority (e.g., priority above a threshold) TID must be mapped to a threshold number of links, each with a quality above a corresponding threshold. Again, different priority levels of TID may be associated with different threshold numbers of links and/or different link quality thresholds. In some embodiments, TIDs below a threshold priority may not be associated with link number and/or quality thresholds or a basic threshold may be used (e.g., at least one low quality link may be considered sufficient for a low priority TID, etc.).

In order to determine whether the mapping proposal is suitable, the non-AP MLD may determine whether each active TID is mapped to a sufficient link or set of links, e.g., according to priority of the TIDs and number and/or quality of links mapped for each TID.

If at least one TID is not mapped to a sufficient link or set of links, the non-AP MLD may determine that the mapping proposal is not suitable. In some embodiments, the non-AP MLD may store information about the TID(s) that is/are not mapped to a sufficient link(s) as a reason or reasons that the proposal is not considered suitable. The reason or reasons may be provided to the AP MILD, e.g., upon the determination or at a future time. For example, the non-AP MLD and AP MLD may have a shared (e.g., standardized) set of reason codes useable to indicate such reason(s) or other information. The reason(s) and/or other information may be determined in a manner to be useable by the AP MILD, e.g., for selecting further mapping proposals.

In some embodiments, if at least one TID is not mapped to a sufficient link or set of links, the non-AP MILD may further determine one or more suitable mappings, e.g., for a counter proposal to the AP MLD. The one or more suitable mappings may be determined according to the TID priorities, link qualities, and thresholds for priority, quality, and number of links as discussed above. For example, the non-AP MLD may determine one or more mapping that results in each TID being mapped to a sufficient link/set of links. In some embodiments, the non-AP MLD may determine a mapping in which the individual TIDs are respectively mapped to the minimum number and/or quality of links sufficient for their respective individual priorities.

If the TIDs are mapped to a sufficient link or set of links (e.g., if the individual respective TIDs are mapped to a respective sufficient link or set of links), then the non-AP MLD may determine that the mapping proposal is suitable. In response to determining that the mapping proposal is suitable, the non-AP MLD may adopt/implement the mapping proposal. For example, if the non-AP MLD does not have any high-priority traffic, it may adopt the AP preferred mapping (e.g., an AT2LS or EAT2LS mapping request from the AP MLD). In other words, the non-AP MLD may apply the AP preferred mapping for the TIDs. The non-AP MLD may apply the AP preferred mapping at expiration of the counter proposal timer. The AP MLD may also apply the AP preferred mapping at the same time, e.g., at expiration of the counter proposal timer.

It will be appreciated that, if the AP preferred mapping is considered suitable by the non-AP ML), that some or all subsequent portions of FIG. 12 may be omitted or delayed indefinitely, according to some embodiments. For example, the AP preferred mapping may be used by the AP MLD and non-AP MLD until either MLD determines that the AP preferred mapping is no longer suitable (e.g., due to a change in active TIDs, loads, or conditions as mentioned above). In the event that either MLD determines that a current mapping (e.g., the AP preferred mapping or any mapping mutually implemented) is no longer suitable, the MLD may transmit a T2L negotiation request to the peer MLD as further discussed with respect to 1232 below.

The non-AP MLD may register priority traffic with the AP MLD (1214), according to some embodiments. For example, the non-AP MLD may register any high priority (e.g., above a priority threshold) TID with the AP MLD as being a high priority TID. Similarly, the non-AP MLD may provide information about the prioritization (and/or other characteristics) of the TID(s) (e.g., only high priority TIDs or all TIDs) to the AP MHLD. For example, the non-AP MLD may transmit an indication of any reason(s) that the AP preferred mapping is considered unsuitable.

Figure 13:
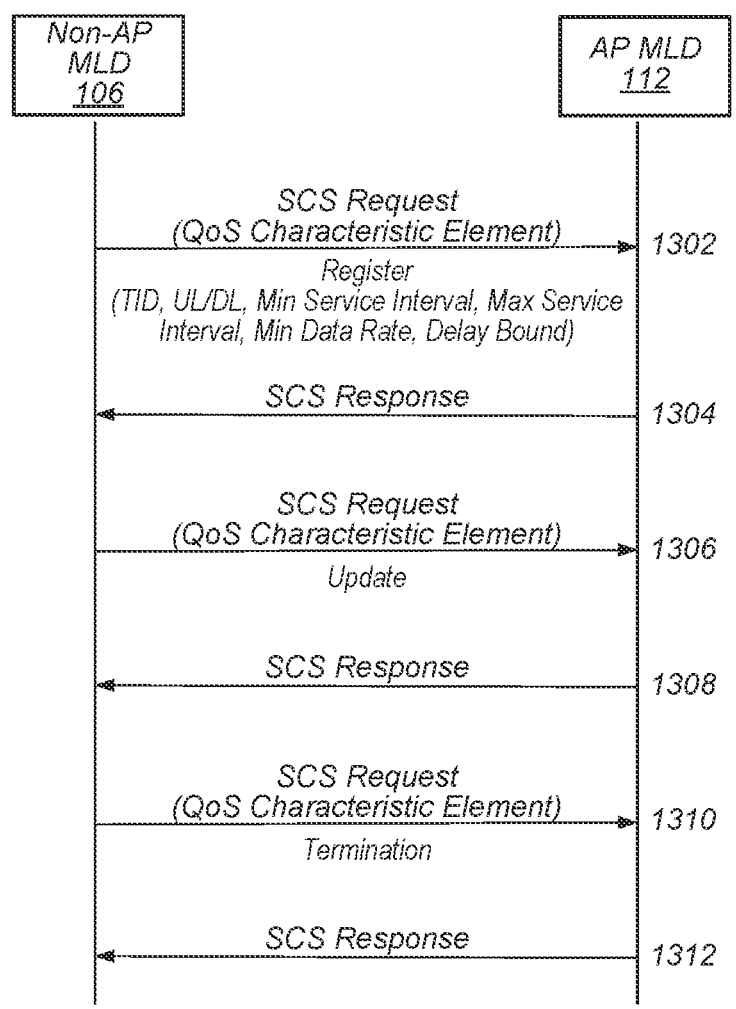
FIG. 13 illustrates an example method of registering priority traffic, according to some embodiments.

In order to register priority traffic, the AP MLD and non-AP MLD may complete one or more stream classification service (SCS) handshakes. FIG. 13, discussed further below, illustrates SCS handshakes, according to some embodiments.

In some embodiments, as an alternative to registering the priority traffic or in addition to registering the priority traffic, the non-AP MLD may transmit a T2L negotiation request to the AP MILD. The T2L negotiation request may contain a counter proposal mapping (or mappings), such as a suitable EAT2LS mapping. For example, the non-AP MLD may indicate one or more suitable mappings, e.g., that map the active TIDs to sufficient links or sets of links according to the priority of the TIDs (e.g., as discussed above with respect to 1212). In response to transmitting such a counter proposal, the non-AP MLD may stop (e.g., cancel or reset) the counter proposal timer (e.g., which may have been started based on receiving the AP preferred mapping in 1208). The non-AP MLD may start (e.g., or restart) the counter proposal timer based on transmitting the counter proposal. The AP MLD may receive the T2L negotiation request with the counter proposal and may cancel/reset the first counter proposal timer (e.g., from 1208) and start/restart the counter proposal timer based on receiving the counter proposal from the non-AP MLD. Thus, the AP MLD and non-AP MLD may each use corresponding counter proposal timers.

In some embodiments, the T2L negotiation request from the non-AP MLD may contain a counter proposal mapping (or mappings) indicating an alternative AT2LS mapping (different from the first mapping proposed by the AP MLD). The non-AP MLD may include a reason code and/or additional information element together with the counter proposal. For example, the non-AP MILD may include a reason code indicating "multi-radio coexistence" and also include a Link Preference element, which specify which link(s) may suffer serious multi-radio coexistence issue (e.g., due to Wi-Fi/Bluetooth (BT) coexistence issues, etc.). The reason code and the additional information element may be used to justify or explain the counter proposal with an alternative AT2LS mapping.

The AP MLD and the non-AP MLD may determine and apply a second mapping based on the registered priority traffic (1216), according to some embodiments. In other words, if information on priority traffic has been registered (e.g., in 1214), then the AP MLD and the non-AP MLD may determine a second mapping that provides sufficient links for the registered priority TIDs. For example, the MLDs may (e.g., individually) determine an EAT2LS mapping that maps all registered priority TIDs to all links. Other TIDs may be mapped to fewer links, e.g., as in the AP preferred mapping. In other words, the second mapping may be determined (e.g., by each MLD) based on adjusting the AP preferred mapping so that the high priority TID(s) are/is mapped to all links, and making no other changes. Other approaches for determining the second mapping may be used as desired.

In some embodiments, the second mapping may be applied without using a counter proposal timer. For example, the second mapping may be applied immediately following registration of the priority traffic (e.g., subject to a processing delay period, if applicable). For example, the second mapping may be applied upon an SCS response from the AP MLD to the non-AP MLD.

Thus, registration of the high priority TIDs (in 1214) may allow the non-AP MLD and AP MLD to promptly transmit and receive traffic of the prioritized TIDs on all links (e.g., or the links mapped in the second mapping).

In some embodiments, a counter proposal mapping (e.g., provided by the non-AP MLD in 1214) may be applied as a second mapping. For example, the AP MLD may verify that the TIDs mapped to additional links (e.g., according to the counter proposal relative to the AP preferred mapping) may be registered as priority TIDs. If such verification is performed, the AP MLD may treat the counter proposal mapping as a second mapping, and it may be applied.

The AP MLD and the non-AP MLD may each start (e.g., or restart) the counter proposal timer based on applying the second mapping.

The AP MLD may determine whether the second mapping or counter proposal mapping from the non-AP MLD is suitable (1218), according to some embodiments. Such a determination may be made while the counter proposal timer (e.g., started by a registration of priority traffic in 1214 or a counter proposal from the non-AP MLD in 1214) is running. For example, the AP MLD may determine whether the second or counter proposal mapping is suitable based on whether the mapping is likely to allow the AP MLD to balance load of any connected non-AP MLDs across all available links given available information such as traffic patterns and load levels.

In the event that the second or counter proposal mapping is considered suitable, the AP MLD may apply it. Such a mapping may be updated as needed, e.g., as discussed with respect to 1232. Thus, other portions of FIG. 12 may be omitted, according to some embodiments.

If the second mapping or counter proposal is determined to be unsuitable, the AP MLD may determine a mapping for a further counter proposal. The further counter proposal mapping may be selected based on information about the prioritization of the TIDs, reasons provided by the non-AP MLD for the unsuitability of the AP preferred mapping, information about the constraints faced by the non-AP MILD, and/or information about the AP MLDs load balance and traffic on the links. For example, in response to the registration of the priority traffic, the AP MLD may determine a counter proposal mapping that provides more and/or better quality links for the high priority TID(s) while also being likely to allow the AP MLD to balance load of any connected non-AP MILDs across all available links given available information such as traffic patterns and load levels. Similarly, in response to a counter proposal from the non-AP MLD, the AP MLD may determine a counter proposal mapping that provides more and/or better quality links (relative to the AP preferred mapping) for TID(s) that would be mapped to all links according to the non-AP MILD's counter proposal while also being likely to allow the AP MLD to balance load of any connected non-AP MLDs across all available links given available information such as traffic patterns and load levels. In other words, the AP MLD may attempt to select a mapping that provides more and/or better links for any TID(s) indicated to be prioritized by the non-AP MLD, while also maintaining sufficient flexibility for the AP MLD to balance load. The further counter proposal mapping may be an AT2LS mapping or an EAT2LS mapping.

If the second mapping or counter proposal is determined to be unsuitable, the AP MLD may determine one or more reason code and/or other information about the load balancing constraints. This information may be determined in a manner to be useable by the non-AP MLD, e.g., for selecting further mapping proposals.

The AP MLD may send a second request for mapping to the non-AP MLD (1220), according to some embodiments. The second request for mapping may include an indication of the further counter proposal mapping. For example, the AP MLD may send a T2L negotiation request to the non-AP MLD. For example, the AP MLD may request/recommend an AT2LS mapping, e.g., when the non-AP MLD proposes: 1) an EAT2LS mapping; or 2) a different AT2LS mapping. Further, the AP MLD may also request/recommend an EAT2LS mapping, when the non-AP MLD proposes a different EAT2LS mapping.

The second request for mapping may include an indication of the reason(s) that the second mapping or counter proposal of the non-AP MLD is not considered suitable by the AP MLD and/or of the constraints faced by the AP MLD (e.g., in balancing load). Further, the second request for mapping may include a reason code or other indication of the constraint(s) faced by the AP MLD, e.g., related to using the links and/or balancing load. For example, the second request may indicate a number of TIDs (e.g., and/or other metric for the amount of traffic) that may be mapped to one or more links, etc. As another example, reason codes indicating "load balancing" or "guaranteed low latency" along with related information elements may be provided, as discussed above. Such information may be useable by the non-AP MLD in selecting a proposed mapping that may be acceptable to the AP MLD.

The AP MLD and the non-AP MLD may each start (e.g., or restart) the counter proposal timer based on transmission (e.g., or reception, in the case of the non-AP MHLD) of the second request for mapping.

Upon receiving the second request for mapping (e.g., T2L negotiation request), the non-AP MLD may determine (1221) and potentially send (1222) a response (e.g., T2L negotiation response), according to some embodiments. To determine the response, the non-AP MLD may determine whether the proposal is suitable or an acceptable compromise. For example, the non-AP MLD may consider priority of TIDs in relation to the links mapped for the TIDs according to the proposal (e.g., the further counter proposal) for mapping, e.g., as discussed above with respect to 1212. The non-AP MLD may also consider its link constraint(s), e.g., multi-radio coexistence issues as discussed above. Additionally, the non-AP MLD may consider the reason code(s) or other information provided by the AP MILD, e.g., in order to determine whether the further counter proposal may be considered an acceptable compromise, in view of the constraints of the AP MLD. For example, even if the further counter proposal may not be fully suitable (e.g., because at least one TID is not mapped to a sufficient number/quality of links), it may be considered an acceptable compromise if the reason(s)/constraints indicate that the AP MLD may not be able to provide a fully suitable mapping. In such a case, the non-AP MLD may consider one or more secondary thresholds (e.g., a higher priority threshold, and/or lower thresholds for number/quality of links) for determining acceptability of the mapping, according to some embodiments.

The response to the second request for mapping may use one of the following options: 1.) accept and apply the further counter proposal (e.g., requested AT2LS or EAT2LS) mapping; 2.) propose an alternative mapping; or 3.) request to continue using the current (e.g., second or counter proposal, e.g., EAT2LS) mapping. The response may further include one or more reasons (e.g., codes) or other information related to the further counter proposal, e.g., if the further counter proposal is not accepted. Further, if the response includes option 2 or option 3 (e.g., counter proposals), the non-AP MLD may continue using the current mapping for a period of time, e.g., as discussed further below.

In some embodiments, if the further counter proposal is accepted, no response may be transmitted. In that case, the AP MLD and non-AP MLD may apply the further counter proposal upon expiration of the counter proposal timer.

In some embodiments, if the further counter proposal is accepted, the mapping may be used indefinitely, e.g., subject to update as needed, e.g., as described with respect to 1232.

In the event that a response according to option 2 or 3 is transmitted, the AP MLD may receive the response and determine whether to accept the proposed mapping or to issue a final instruction (1224), according to some embodiments. For example, in response to receiving a counter proposal in a T2L negotiation response from the non-AP MLD, the AP MLD may send a T2L negotiation request with a final decision. The T2L negotiation request with the final decision may or may not solicit a response from the non-AP MLD. For example, the T2L negotiation request may include a field to indicate whether or not a response is requested or different formats may be used for the request to indicate this, etc.

To determine whether to accept the proposal, the AP MLD may consider the factors discussed above with respect to 1218. Additionally, the AP MLD may consider any reason(s) or other information indicated by the non-AP MILD. Further, the AP MLD may use one or more lower threshold for load balancing, e.g., in order to determine whether the proposal is an acceptable compromise in view of the prioritization/reasons provided by the non-AP MLD.

In the event that the AP MLD determines that the proposal from the non-AP MLD is acceptable, the AP MLD may implement the proposed mapping. The AP MLD may notify the non-AP MLD and implement the mapping at that time. Thus, the AP MLD may send a response with a final decision accepting the non-APs proposal.

In the event that the AP MLD determines that the proposal from the non-AP MLD is not acceptable, the AP MLD may transmit a final response rejecting the proposal. Such a final response may indicate a requirement for the non-AP MLD to implement the most recent proposal of the AP MLD (e.g., the further counter proposal as transmitted in 1220). In some embodiments, the final response may specify the mapping.

In some embodiments, a mapping indicated in the final response may be different than a previous requested mapping (e.g., the further counter proposal as transmitted in 1220). For example, the AP MLD may determine one or more modification to the further counter proposal based on the reason(s) or other information provided by the non-AP MLD in 1222. The AP MLD may thus provide an indication of the modification(s) to the mapping relative to the further counter proposal.

As noted above, a previous mapping (e.g., the second mapping of 1216) may remain in effect for a period of time (e.g., while the AP MLD determines how to respond to the counter proposal from the non-AP MLD). In some embodiments, the period of time may be until the AP MLD transmits and the non-AP MLD receives a final T2L request from the AP MLD. In some embodiments, the counter proposal timer may also be used. For example, based on the non-AP MLD transmitting the response with a counter proposal, the non-AP MLD may start (e.g., or restart) the counter proposal timer. Similarly, the AP MLD may start (e.g., or restart) the counter proposal timer. The AP MLD and non-AP MLD may use the current mapping indefinitely, if the counter proposal timer expires without a final mapping instruction from the AP MLD. In other words, AP MLD may decide not to transmit the final T2L request and thus leave the non-AP MLD to continue using the current mapping. For example, this outcome may occur if the response in 1222 is according to option 3, e.g., indicating a request from the non-AP MLD to continue using the second mapping of 1216.

The non-AP MLD may receive any final mapping instruction and may transmit a response (1228), according to some embodiments. The response may be an acknowledgement of the final mapping instruction. A mapping according to the final mapping instruction may be implemented when the response is transmitted.

In some embodiments, no response may be transmitted, e.g., if the final mapping instruction does not result in a change from a previous mapping and/or if the T2L negotiation request with the final decision does not solicit a response.

Thus, the AP MLD and the non-AP MLD may implement the final mapping according to the final mapping instruction (1230), according to some embodiments. The final mapping may be the same as or different from the default mapping, second mapping, AP preferred mapping, or any other previously applied mapping. The AP MLD and the non-AP MLD may exchange data and/or management/control information in the uplink and or downlink directions according to the final mapping.

The AP MLD and the non-AP MLD may update a current mapping (e.g., the final mapping, etc.) (1232), as needed, according to some embodiments. As noted above, a mapping (e.g., a final mapping, default mapping, AP preferred mapping, or any mutually agreed mapping) may be used by the AP MLD and non-AP MLD until either MLD determines that the mapping is no longer suitable (e.g., due to a change in active TIDs, loads, and/or other conditions as mentioned above). In the event that either MLD determines that a mapping (e.g., the AP preferred mapping or any mapping mutually implemented) is no longer suitable, the MLD may determine a proposed updated mapping and transmit a T2L negotiation request, with an indication of the proposed updated mapping, to the peer MLD. Each MLD may start a counter proposal timer based on the T2L negotiation request. If no counter proposal is provided prior to expiration of the timer, the proposed updated mapping, then the proposed updated mapping may be implemented. If a counter proposal is provided, the counter proposal timers may be restarted by both devices. In some embodiments, after each MLD has had an opportunity to make a proposal or counter proposal for an updated mapping, the AP MLD may make a final decision on an updated mapping to apply. In some embodiments, after each MLD has had an opportunity to make a proposal or counter proposal for an updated mapping, the non-AP MLD may make a final decision on an updated mapping to apply.

As another possible approach to updating a current mapping, an update may be applied automatically subject to certain conditions. For example, a non-AP MLD operating according to an EAT2LS mapping may automatically revert to an AT2LS mapping (or possibly a different EAT2LS mapping) if all registered priority TIDs are terminated or become inactive. The AP MLD may correspondingly automatically change to the AT2LS mapping in response to a deregistration or termination of the priority TIDs. For example, the AP MLD and non-AP MLD may automatically switch to an AP preferred mapping in such an event. In some embodiments, a fallback mapping (e.g., the same or different than the AP preferred mapping) may be designated by the AP MLD for use in such circumstances.

Figure 14:
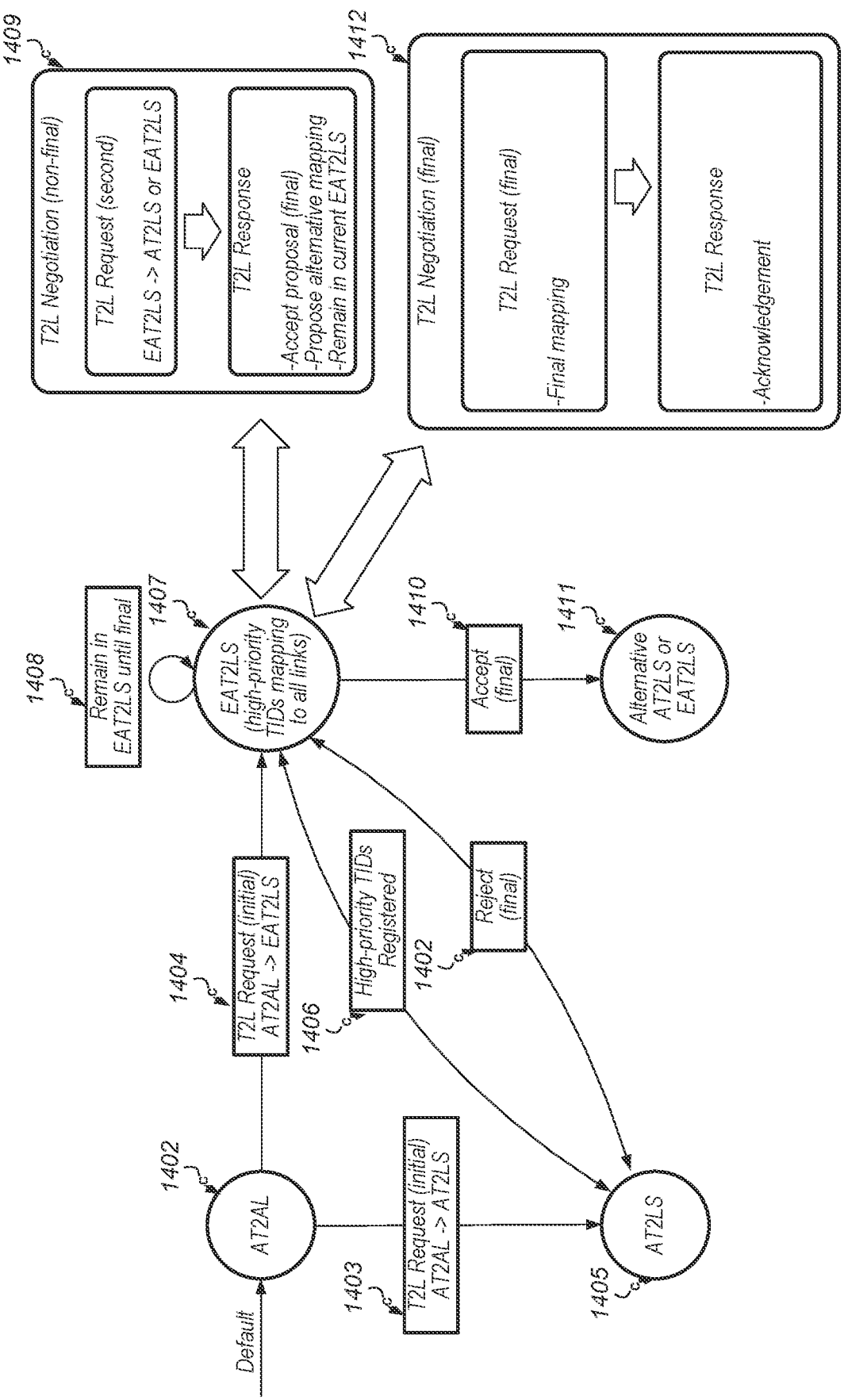
FIG. 14 illustrates a state diagram of aspects of the method of FIG. 12, according to some embodiments.

FIGS. 13-14 and Additional Information.

In some embodiments, the AP MLD may accept a proposed mapping (e.g., at any time) from the non-AP MLD and may make the acceptance with conditions. The conditions may include certain actions that the non-AP MLD must follow or avoid while the proposed mapping is in use. Such conditions may be an additional way for the AP MLD to manage traffic on a plurality of links while also providing increased flexibility to the non-AP MLD to use more/ different links (e.g., according to the proposed mapping). As one example condition, the AP MLD may specify that the non-AP MLD follow multi-user (MU) enhanced distributed channel access (EDCA) (MU-EDCA) for uplink transmissions on a specified link. As another example condition, the AP MLD may specify that the non-AP MLD waits for a trigger from the AP MLD prior to transmitting uplink transmissions on the specified link. As another example condition, the AP MLD may specify that the non-AP MLD use the specified link according to a specific duty cycle (e.g., only at particular times). As another example condition, the AP MLD may assign a certain number of tokens to a non-AP MLD (or a group of non-AP MLDs) for a certain period, and each token may allow one non-AP MLD to access a specified link for one or a certain number of UL transmission opportunities (TXOPs) or a certain time window, etc. As another example condition, the AP MLD may specify that the non-AP MLD use a specified link for (e.g., only) a limited time window within a certain time period. As another example condition, the AP MLD may specify that the non-AP MLD use the specified link subject to a limitation on the amount or rate of use, e.g., the AP MLD may specify a maximum data rate for the link(s). The AP MLD may combine these (or other conditions) in various ways. For example, the AP MLD may specify that the non-AP MLD use a specified link (or links) subject to a duty cycle, a time limit, or trigger-based usage. For example, the non-AP MLD may be allowed to use the link at any time during the time limit and after the time limit may use the link only according to the duty cycle or based on being triggered.

In some embodiments, the T2L negotiation may include a three-way message structure. For example, such a structure may include: 1) request, 2) response, and 3) confirm. For example, (1) an initiator sends a mapping request. Then, (2) a responder sends a mapping response, which can include a counter proposal, with a counter reason and/or other information. Then, (3) the initiator sends a mapping confirm with final decision. Such a three-way message structure may be an example of performing updates, e.g., according to 1232 of FIG. 12, among various possibilities. However, such a three-way message structure may also be used in other portions of the method of FIG. 12 as desired.

For example, communication may be established using a default mapping. An AP MILD (initiator) may initiate the three-way message with a request (1) for an AP preferred mapping (1208). A non-AP MILD may respond (2) with a counter proposal and other information (1214). The AP MLD may then send a confirmation (3) with a final mapping instruction (1226).

As another example, communication may be established using a default mapping. A non-AP MLD (initiator) may initiate the three-way message with a request (1) for an alternative mapping (1214). An AP MLD may respond (2) with a counter proposal and other information (1220). The non-AP MLD may then send a confirmation (3) accepting or rejecting the counter proposal (1222).

In some embodiments, a non-AP MLD may make the final decision in a T2L negotiation response (e.g., in 1222 of FIG. 12). The final decision may be bounded by the following options: 1) accept a requested mapping from the AP MLD (e.g., as indicated in 1220 of FIG. 12); 2) selecting an alternative AT2LS or EAT2LS mapping with stated constraints (e.g., which may be provided by the AP MLD, e.g., in 1220 of FIG. 12); 3) selecting a compromise EAT2LS mapping, e.g., with high priority TIDs mapped to all links with other TIDs mapped to the links of a requested AT2LS mapping from the AP MLD. As an example of options 2 and 3, assume an AP MLD proposes a AT2LS mapping with link 1 and link 2 enabled, but link 3 disabled. For option 2, the non-AP MLD may select link 1 and link 3 enabled, but link 2 is disabled (e.g., an alternative AT2LS relative to the AP MLD's proposal). For option 3, the non-AP MLD may select link 1 and link 2 as enabled (same as AP MLD's AT2LS proposal), and mapping high priority TIDs on link 3 (e.g., as well as links 1 and 2). Thus, in option 3, the AT2LS proposed by the AP MLD may be viewed as a subset of the EAT2LS selected by the non-AP MLD.

FIG. 13 illustrates example stream classification service (SCS) handshakes, according to some embodiments. As shown, 3 different types of SCS handshakes may be used, e.g., to register, update, or terminate priority TID.

To register a priority TID, the non-AP MLD may send an SCS request to the AP MLD (1302), according to some embodiments. The request may include a quality of service (QoS) characteristic element. The QoS characteristic element may describe the TID, e.g., using a TID identifier, an indication of uplink or downlink, an indication of a minimum and/or maximum service interval (e.g., to describe intervals between packets, e.g., of periodic traffic. For example, each period, the application may generate one or a batch of packets, and then may pause until next period), a minimum data rate, and/or a delay bound (e.g., latency). The AP MLD may transmit a response (e.g., acknowledgement) (1304), according to some embodiments.

To update a priority TID, the non-AP MLD may send an SCS request to the AP MLD (1306), according to some embodiments. The request may include a QoS characteristic element and an indication that the registration of the priority TID is to be updated. The QoS characteristic element may describe the updated aspect of the TID. The AP MLD may transmit a response (e.g., acknowledgement) (1308), according to some embodiments.

To deactivate/terminate a priority TID, the non-AP MLD may send an SCS request to the AP MLD (1310), according to some embodiments. The request may include a QoS characteristic element and an indication that the registration of the priority TID is to be canceled. The QoS characteristic element may identify the TID. The AP MLD may transmit a response (e.g., acknowledgement) (1312), according to some embodiments.

FIG. 14 illustrates a state diagram of aspects of the method of FIG. 12, according to some embodiments. As shown, an AP MLD and non-AP MLD may begin communication using a default mapping (e.g., AT2AL) (1402). The AP MLD may transmit an initial request to transition to a different (e.g., AP preferred) mapping, e.g., AT2LS or EAT2LS (1403 or 1404, respectively). Following 1403, the non-AP MLD may either operate in the AP preferred AT2LS mapping, if no high priority TIDs are active (1405) or may register any high priority TIDs (1406). Following 1406, the AP MLD and non-AP MLD may operate in EAT2LS (e.g., according to a second mapping, e.g., with high priority TIDs mapped to all links) (1407). Similarly, following 1404, the AP MLD and non-AP MLD may operate in EAT2LS (e.g., according to the EAT2LS mapping proposed by the AP MLD in 1404) (1407). Once in EAT2LS in 1407, the AP MLD and non-AP MLD may operate in EAT2LS until a final mapping is negotiated (1408).

From 1407, if the active EAT2LS mapping is not suitable for the AP MLD, the AP MLD may initiate further (non-final) T2L negotiations (1409). To do so, the AP MLD may transmit a second T2L request to the non-AP MLD. The second T2L request may indicate a further counter proposal mapping (e.g., a proposed AT2LS mapping or a different proposed EAT2LS mapping). The non-AP MLD may transmit a T2L response to the non-AP MILD. The response may: 1) accept the proposal (e.g., resulting in the proposed mapping being implemented as a final mapping by the AP MLD and non-AP MLD); 2) propose an alternative mapping (either a different EAT2LS than the current or an AT2LS); or 3) propose to remain in the current EAT2LS mapping. If the non-AP MLD transmits a response according to option 2) or 3), the AP MLD and non-AP MLD may operate in the current EAT2LS until a final mapping is negotiated (1408).

If the non-AP MLD transmits a response according to option 3), the AP MLD may determine if the current (e.g., EAT2LS) mapping is acceptable, e.g., in view of any information provided by the non-AP MILD. If the current mapping is acceptable, the AP MLD may allow the counter proposal to lapse and thus allow the current mapping to become final (1407).

If the non-AP MLD transmits a response according to option 2), the AP MLD may determine if the proposed alternative mapping is acceptable. If the proposed mapping is acceptable, the AP MLD may accept it (1410) and the AP MLD and non-AP MLD may operate according to the alternative mapping (1411). If the proposed mapping is not acceptable, the AP MLD may initiate final T2L negotiation (1412). The AP MLD may transmit a final T2L request, e.g., indicating a final mapping. The non-AP MLD may respond, e.g., to acknowledge the instruction. The AP MLD and non-AP MLD may operate according to the final mapping.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating an AP MLD may be the basis of a corresponding method for operating a non-AP MLD and vice versa, e.g., by interpreting each message/signal X received by the non-AP MLD in the DL as message/signal X transmitted by the AP MLD, and each message/signal Y transmitted in the UL by the non-AP MLD as a message/signal Y received by the AP MHLD. Moreover, a method described with respect to a AP MLD may be interpreted as a method for a non-AP MLD in a similar manner.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets).

In some embodiments, a wireless device may be configured to include a processor (and/or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   at an access point (AP) multi-link device (MILD) (AP MLD):
   providing a plurality of links;
   transmitting, to a non-access point MLD (non-AP MLD), an initial traffic identifier (TID) to link (T2L) mapping request for a first mapping between a plurality of TIDs and at least a subset of the plurality of links for communication with the non-AP MHLD, wherein a first TID is mapped to a first number of the plurality of links according to the first mapping;
   receiving, from the non-AP MHLD, a request to register the first TID as high-priority; and
   in response to the request to register the first TID as high-priority, changing to a second mapping for communication with the non-AP MLD, wherein the first TID is mapped to a second number, greater than the first number, of the plurality of links according to the second mapping.

2. The method of claim 1, wherein the request to register the first TID as high priority comprises a stream classification service (SCS) request.

3. The method of claim 2, further comprising transmitting, to the non-AP MLD an SCS response acknowledging the SCS request.

4. The method of claim 1, further comprising associating with the non-AP MLD, wherein the initial T2L mapping request comprises a T2L negotiation request transmitted after said associating.

5. The method of claim 1, wherein the initial T2L mapping request comprises at least one of an association response or a beacon/probe response.

6. The method of claim 1, wherein the request to registerer the first TID as high priority comprises a list of high priority TIDs.

7. The method of claim 1, wherein the request to registerer the first TID as high priority comprises a proposed mapping.

8. The method of claim 7, wherein the second mapping is the proposed mapping.

9. An apparatus, comprising:
   a processor configured to cause a non-access point (AP) multi-link device (MLD) (non-AP MILD) to:
   associate, with an AP MHLD, using a default mapping between a plurality of traffic identifiers and a plurality of links, wherein the plurality of links comprises various links connecting the AP MLD and the non-AP MLD;
   receive, from the AP MHLD, an indication of a second mapping between the plurality of traffic identifiers and the plurality of links, wherein according to the second mapping at least a first traffic identifier is mapped to fewer links than according to the default mapping;

determine that the first traffic identifier is high priority; and in response to the determination that the first traffic identifier is high priority:

transmit, to the AP MLD, a request to register the first traffic identifier as high priority; and change to a third mapping, wherein according to the third mapping at least the first traffic identifier is mapped to more links than according to the second mapping.

10. The apparatus of claim 9, wherein according to the third mapping at least the first traffic identifier is mapped to all links of the plurality of links.

11. The apparatus of claim 9, wherein the request to register the first traffic identifier as high priority comprises a stream classification service (SCS) request, wherein the processor is further configured to cause the non-AP MLD to:
transmit, to the AP MLD, in addition to the SCS request, an indication of the third mapping.

12. The apparatus of claim 9, wherein the processor is further configured to cause the non-AP MLD to, at a later time:
determine to update the third mapping;
in response to the determination to update the third mapping, transmit, to the AP MLD a request for an alternative mapping;
receive, from the AP MLD, a counter proposal; and
transmit, to the AP MLD, a confirmation either accepting or rejecting the counter proposal.

13. The apparatus of claim 9, wherein the processor is further configured to cause the non-AP MLD to:
receive a beacon from the AP MLD; and
determine the default mapping based on the beacon.

14. The apparatus of claim 9, wherein the request to register the first traffic identifier as high priority comprises an indication of a proposed mapping.

15. The apparatus of claim 9, wherein the processor is further configured to cause the non-AP MLD to:
start a timer upon receiving the indication of the second mapping; and
reset the timer upon transmitting the request to register the first traffic identifier as high priority.

16. The apparatus of claim 15, wherein the change to the third mapping is in response to expiration of the timer.

17. The apparatus of claim 9, further comprising a radio operably coupled to the processor.

18. An apparatus, comprising:
a processor configured to cause an access point (AP) multi-link device (MLD) (AP MILD) to:
associate, with a non-AP MHLD, using a default mapping between a plurality of traffic identifiers and a plurality of links, wherein the plurality of links comprises various links connecting the AP MLD and the non-AP MLD;
transmit, to the non-AP MLD, an indication of a second mapping between the plurality of traffic identifiers and the plurality of links, wherein according to the second mapping at least a first traffic identifier is mapped to fewer links than according to the default mapping;
receive, from the non-AP MHLD, a request to register the first traffic identifier as high priority; and
change to a third mapping, wherein according to the third mapping at least the first traffic identifier is mapped to more links than according to the second mapping.

19. The apparatus of claim 18, wherein the processor is further configured to cause the AP MLD to:
start a timer upon receiving the request, wherein the change to the third mapping is triggered by expiration of the timer.

20. The apparatus of claim 18, further comprising a radio operably coupled to the processor.

* * * * *

UNITED STATES PATENT AND TRADEMARK OFFICE
CERTIFICATE OF CORRECTION

PATENT NO. : 12,336,034 B2
APPLICATION NO. : 17/939191
DATED : June 17, 2025
INVENTOR(S) : Yong Liu et al.

Page 1 of 1

It is certified that error appears in the above-identified patent and that said Letters Patent is hereby corrected as shown below:

In the Claims

Column 28, Line 19, delete "MILD" and insert --MLD--.
Column 28, Line 26, delete "MHLD" and insert --MLD--.
Column 28, Line 29, delete "MHLD" and insert --MLD--.
Column 28, Line 59, delete "MILD" and insert --MLD--.
Column 28, Line 60, delete "MHLD" and insert --MLD--.
Column 28, Line 65, delete "MHLD" and insert --MLD--.
Column 30, Line 13, delete "MILD" and insert --MLD--.
Column 30, Line 14, delete "MILD" and insert --MLD--.
Column 30, Line 25, delete "MHLD" and insert --MLD--.

Signed and Sealed this
Fifteenth Day of July, 2025

Coke Morgan Stewart
*Acting Director of the United States Patent and Trademark Office*